3,323,110
INFORMATION HANDLING APPARATUS IN-
CLUDING FREELY ASSIGNABLE READ-
WRITE CHANNELS
Louis G. Oliari, Brockton, and Robert P. Fischer, Wal-
pole, Mass., assignors to Honeywell Inc., a corporation
of Delaware
Filed Apr. 6, 1964, Ser. No. 357,362
18 Claims. (Cl. 340—172.5)

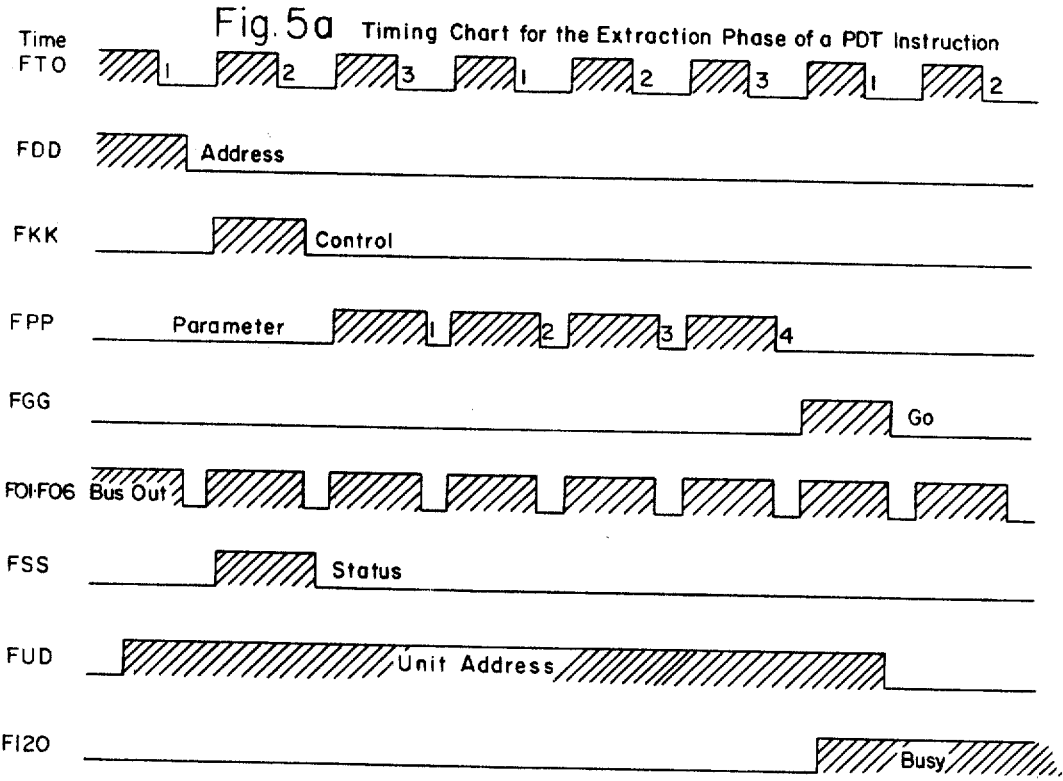
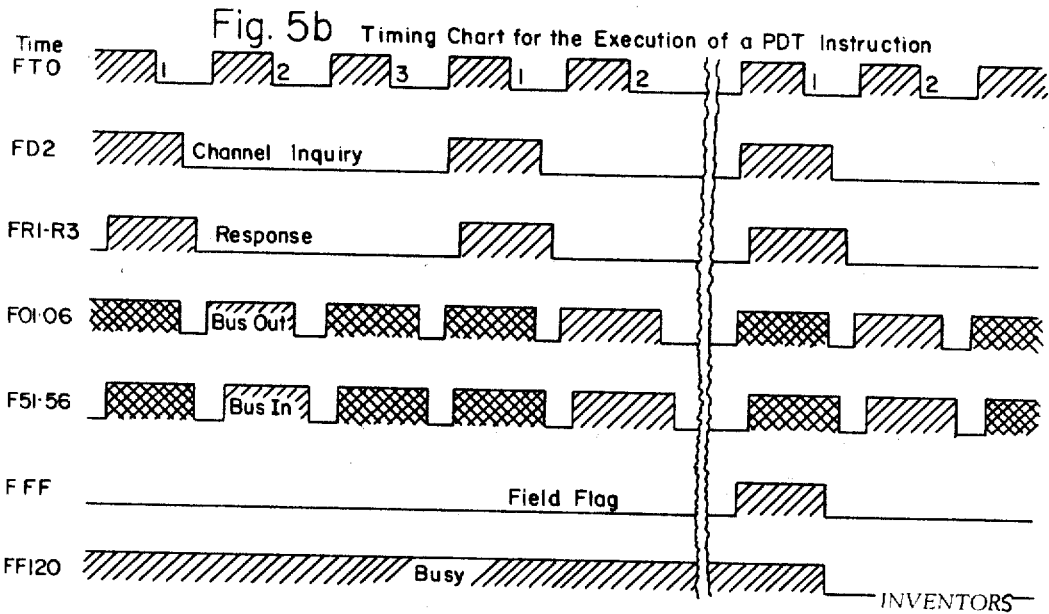

The present invention is concerned with an improved electronic data processing apparatus and, more specifically, with means for enabling a data processing system to simultaneously perform a multiplicity of operations whereby maximum flexibility of operation, consistent with minimum expenditure of hardware and a consequent savings in processing time, is realized.

A representative form of data processing apparatus presently known in the art may incorporate traffic control circuits to facilitate the simultaneous operation of a plurality of peripheral devices on a time-sharing basis. A significant advantage of a system capable of simultaneously processing a plurality of peripheral data transfer instructions is that access to the main memory is required during only a small fraction of the total processing time. Therefore, when a peripheral data transfer instruction is being processed, and the main memory is not being used, another peripheral device or the central processor may gain access to the main memory. These traffic control systems have been further implemented for purposes of time-sharing stored programs within the same data processor. Such implementation may also include the ability of the circuitry to temporarily hold a program signal calling for a peripheral device which is already busy, so that as soon as any peripheral device which is already busy, so that as soon as any peripheral device is released, the next program order related to that signal will be the one first calling for the busy peripheral device. Systems embodying one or more of the above features are disclosed in the patent of Henry W. Schrimpf entitled "Information Handling Apparatus," Patent No. 3,029,414; and the copending application of William M. Kahn et al. entitled "Data Processing Apparatus," Ser. No. 1,555, filed Jan. 11, 1960, now Patent No 3,214,737.

In a data processing system constructed in accordance with the above-mentioned copending application, there is included in combination with a central processor a plurality of peripheral devices. In such a system, the central processor communicates with the peripheral devices via a control unit which may operatively connect a plurality of the peripheral devices to the central processor on a time-sharing basis. In the operation of such a system, the time sequencing may proceed with a plurality of input lines leading from the various peripheral devices to the traffic control unit being scanned and those input lines found to be in demand, honored in successive or time-phased operative cycles. When a demand line is scanned, the signal received indicates that a demand for a particular peripheral device has been established and a single data manipulation will be performed which may comprise a transfer of a plurality of data bits into or out of the memory circuits associated therewith. In order to implement the above mode of operation, each of the peripheral devices must have associated therewith a particular address register to keep track of the location being addressed. Thus, in processing a peripheral "read forward" instruction, that is, an instruction to read data in a forward direction from a peripheral device such as a magnetic tape unit, the address thereof is placed into a read address counter. This address specifies an initial location in a main memory into which the first character or word to be transformed is to be stored. As each word or character is read into the main memory, the read address counter is incremented by one so that all successive words or characters read from the designated peripheral device are placed in succeeding main memory locations. Since a separate address register and interconnecting circuitry is provided for each peripheral device, the expenditure of hardware necessary to the implementation of this function may be quite extensive.

In an ideal capable of simultaneously processing information through a plurality of peripheral devices, the amount of hardware required is a function of the anticipated traffic within the system. More specifically, it should be appreciated that, in any system capable of simultaneous peripheral operation, only a limited number of peripheral devices will be processing information at any one time. This fact has been recognized in the present invention wherein a limited number of transfer or read-write channels are provided for interconnecting a central processor with all of its associated peripheral devices.

Each of the read-write channels comprises a set of time-sequenced control circuits adapted to be operatively associated with a peripheral device and a main memory unit, for the purpose of effecting a transfer or control function over a common distribution circuit. More specifically, the time-sequenced control circuits comprise a pair of storage registers one of which stores information identifying the area of main memory currently being addressed, while the other register stores the starting address location of main memory from which the particular data transfer is initiated. In addition, a memory cycle distributor is provided, the cycling time of which consists of a plurality of sub-intervals, each of which is associated with a particular one of the read-write channels. In the implementation of the present invention, the memory cycle distributor is associated with a peripheral interface which operatively connects a plurality of peripheral devices with a main memory over a common distribution circuit on a time-sharing basis. Thus, in the processing of a data transfer instruction calling for a particular peripheral device, the program instruction may direct that the operation be effected via a particular read-write channel. Accordingly, utilizing a particular pair of storage registers, words or characters of information will be transferred between the main memory unit in the particular peripheral device over the common distribution circuit during successive memory cycle sub-intervals associated with the selected read-write channel.

Means are also provided to indicate the operative condition of each of the read-write channels. These indicating means may be set in response to a data transfer instruction to thereby reserve to the particular peripheral device called for by the program instruction, the memory cycle sub-interval associated with the selected read-write channel. A read-write channel reserved to the processing of a particular program instruction will thus be unavailable for the purpose of interconnecting another peripheral device with the main memory during the operative duration of the execution phase of the present instruction. However, since only a small fraction of the time required to complete the execution of the instruction will be spent with the peripheral device in actual communication with the main memory, those memory cycle subintervals allocated to the processing of the particular instruction but found to be not needed will be available to the processing of central processor orders or to the extraction of other peripheral data transfer instructions which are to be executed via another read-write channel. It is thus apparent that the other peripheral devices may be programmed to operate on the other available read-write channels so as to enable the system to simultaneously process a plurality of peripheral instructions. Upon completion of a data transfer instruction the means indicating the operative status of the associated read-write channel will be automatically reset so that the particular read-write channel will be automatically available to the processing of another peripheral data transfer instruction.

Accordingly, a primary object of this invention is to provide a new and improved traffic control system for use with a data processing apparatus wherein any one of a plurality of read-write channels may be used to freely communicate between a central processor and an associated perhipheral device.

Another object of this invention concerns the ability of a traffic control system to enable the memory of a central processor to communicate with a particular peripheral device via any one of a plurality of read-white channels.

Still another object of this invention concerns the ability of a traffic control system associated with a data processing apparatus to enable any one of a plurality of peripheral devices to communicate directly with any one of a plurality of memory locations via any one of a plurality of read-write channels.

A further object of the present invention is to provide a traffic control system for use with a data processing apparatus which enables a plurality of peripheral devices to simultaneously communicate with a main memory on any one of a plurality of read-write channels.

In accordance with the principles of a preferred embodiment of the present invention, a data processing system is provided wherein the traffic control portion is designed so that a program instruction calling for operation of a peripheral device will automatically have available to it the first transfer or read-write channel to become free. Further, the traffic control system may be implemented in such a manner that the available transfer or read-write channels associated therewith are freely assignable by the programmer. In the latter implementation, the program instruction designates a peripheral device address as well as the transfer or read-write channel by means of which communication with the central processor is to be established. Thus, when an instruction calling for a particular peripheral operation has been processed, the assigned transfer or read-write channel is automatically freed and becomes immediately available for utilization in conjunction with the processing of another program instruction.

A further more specific feature of this invention concerns the ability of a traffic control system, as utilized in conjunction with a data processing apparatus, to couple a central processor to a particular peripheral device over a freely assignable read-write channel by means of a program instruction.

Accordingly, another object of this invention is to provide a traffic control system for use with a data processing apparatus which enables a plurality of peripheral devices to freely communicate with a main memory via a limited number of read-write channels and wherein the read-write channels are automatically made available to subsequent peripheral program instructions at the termination of the processing of preceding instructions.

In another embodiment of the present invention, the programmer is provided with an auxiliary read-write channel which, upon demand, enables a pair of associated peripheral devices to share the auxiliary channel during alternate time cycles. It is possible, through utilization of the auxiliary transfer or read-write channel, to associate selected peripheral devices requiring less activity with this channel to thereby allow high-activity devices to operate on a priority basis through the regular read-write channels.

Accordingly, it is a further object of this invention to provide a traffic control system for a data processing apparatus wherein a plurality of peripheral devices are arranged to communicate with a main memory over a limited number of read-write channels and wherein certain of the transfer or read-write channels are selectively designated to provide priority processing with respect to at least one other read-write channel.

The foregoing objects and features of novelty which characterize this invention, as well as other objects of the invention, are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Figure 1:
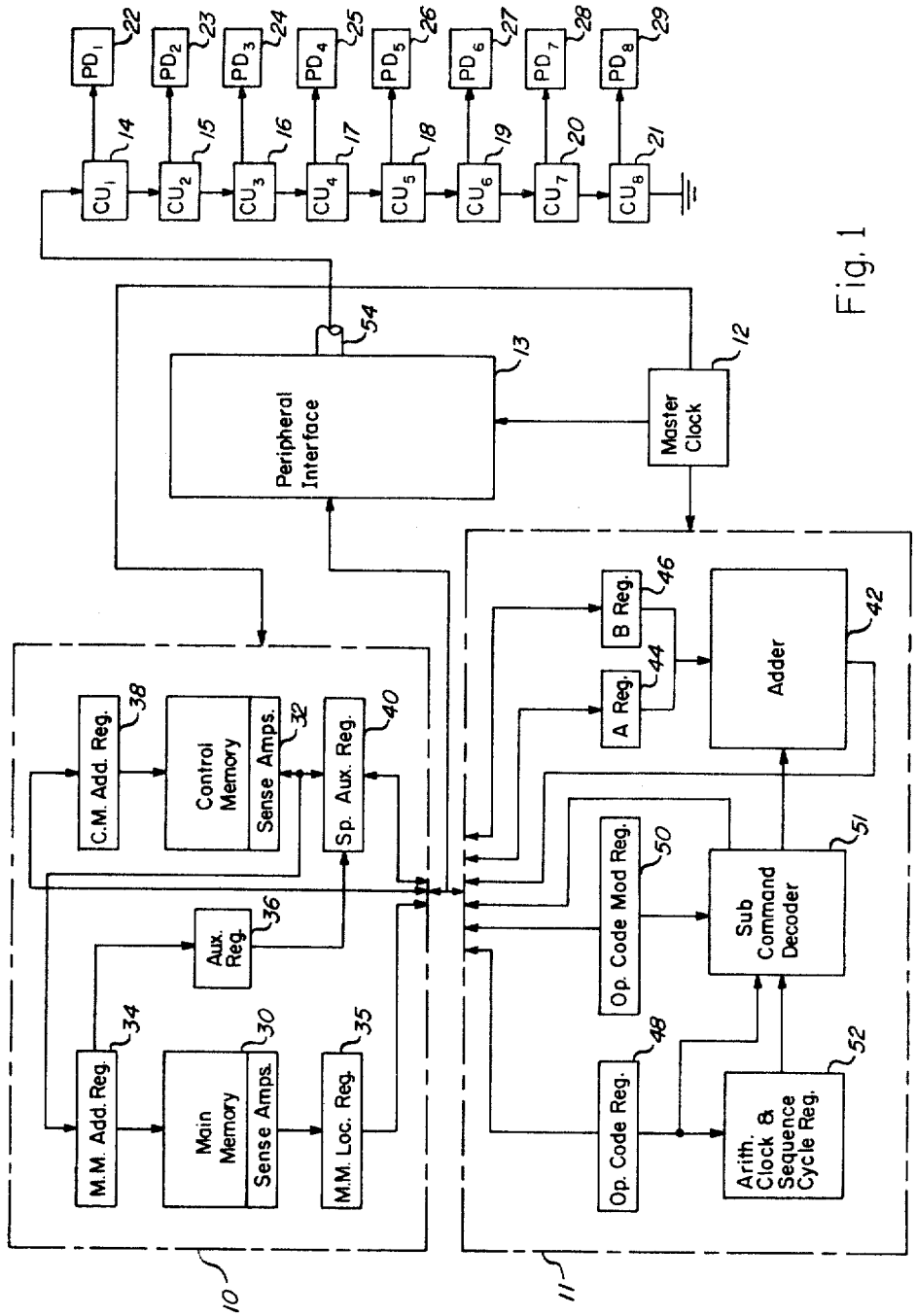
FIGURE 1 is a diagrammatic representation of a data processing system incorporating the principles of the present invention.
Figure 6:
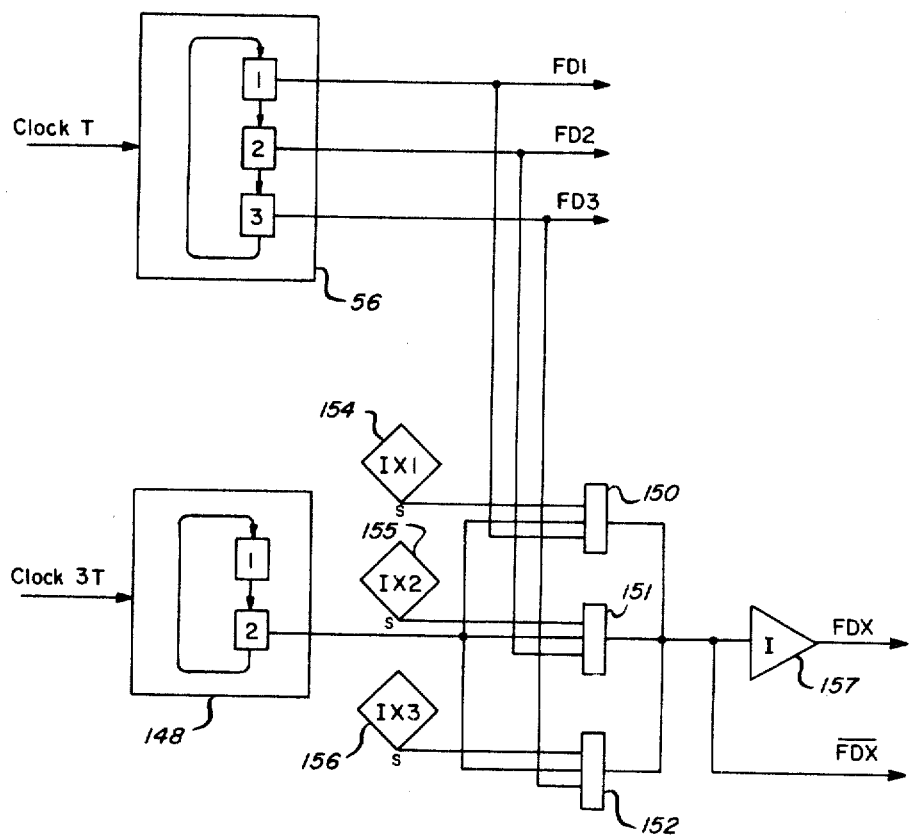
Figure 7:
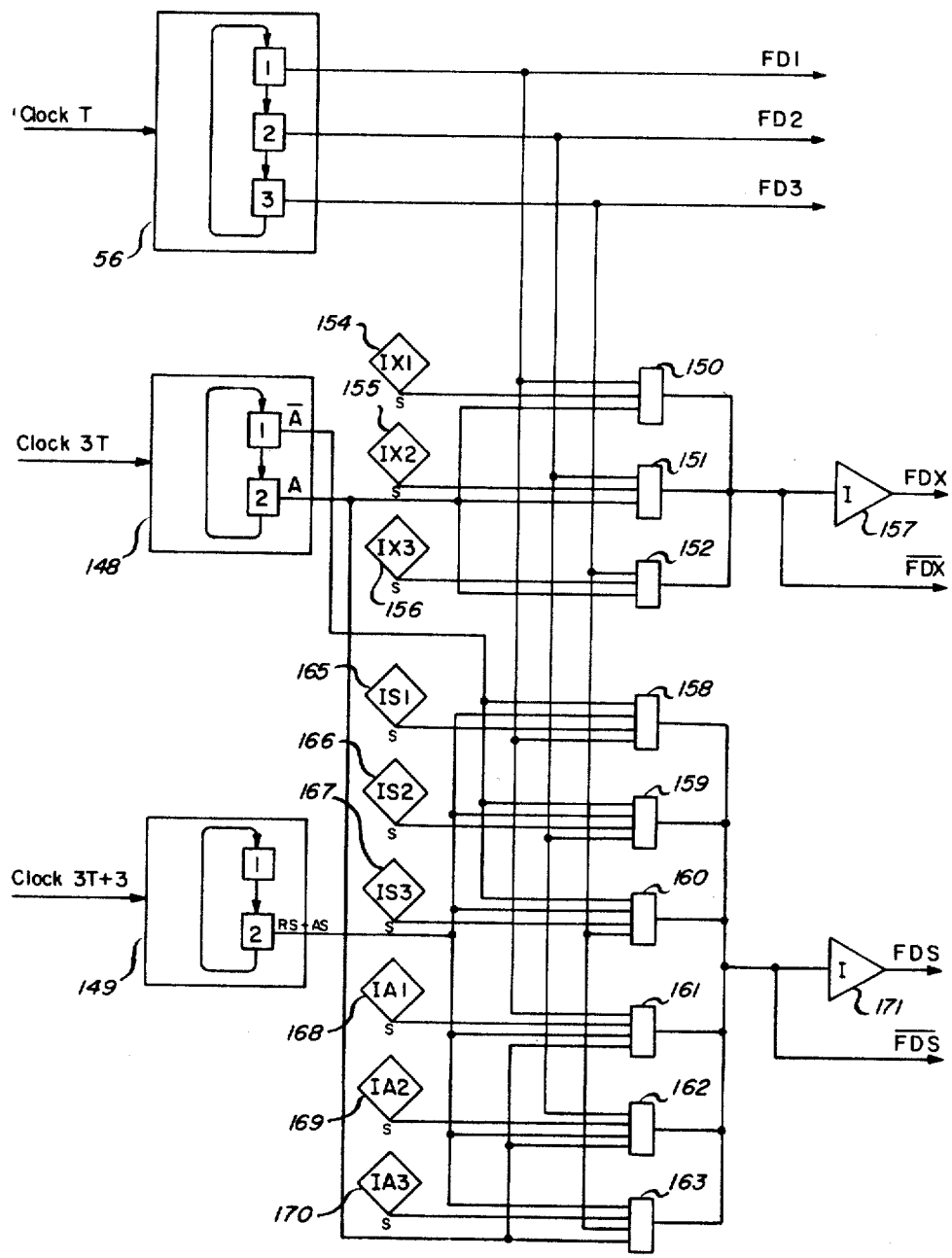
Figure 8:
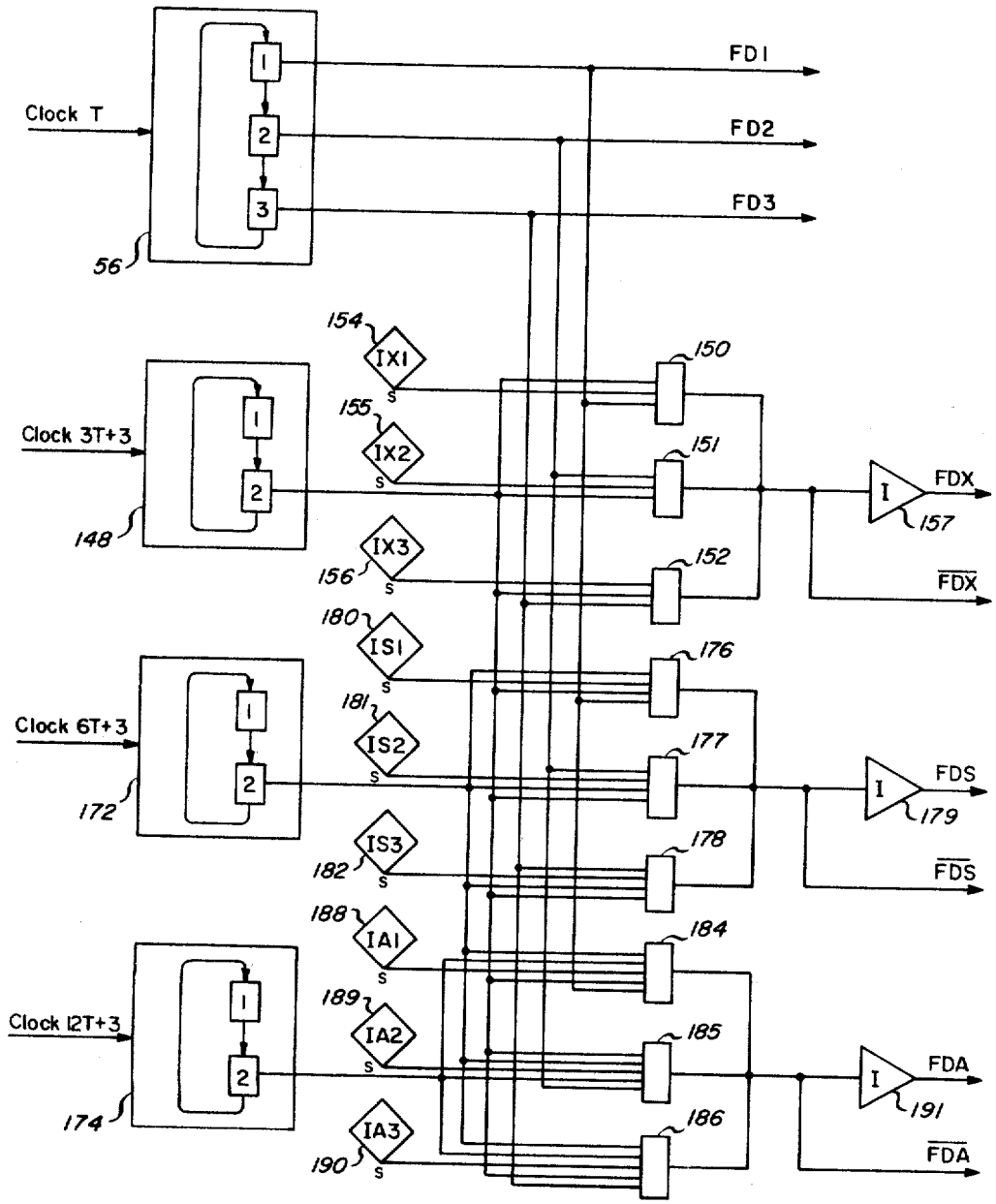

FIGURES 5a and b are timing charts pertinent to the extraction and execution cycles of a Peripheral Data Transfer Instruction; and FIGURES 6, 7 and 8 are diagrammatic representations of logic circuitry for alternatively implementing the activity of the memory cycle distributor of FIGURE 1.

Referring first to FIGURE 1, therein is shown an electronic data processing system constructed in accordance with the principles of this invention which comprises a central processor including a memory portion 10 and an arithmetic unit 11. A master clock 12 is employed to generate timing signals basic to the synchronization of all units within the system. It is to be understood that the processing of instructions within the central processor will proceed in accordance with the basic mode of operation common to this type of apparatus. In this respect, it is common to have associated with the central processor a plurality of peripheral devices which function to transfer data to and from the rest of the system. The peripheral devices may include magnetic storage units, card readers and card punches, random access units, intermediate drum memories, communication equipment and a variety of other special devices. In the illustrated embodiment, a peripheral interface 13 is provided to operatively connect both the memory portion 10 and the arithmetic unit 11 to a plurality of peripheral control units 14 through 21, which in turn control the activities of associated peripheral devices $PD_n$, indicated generally as members 22 through 29.

Considering in more detail the various components of a preferred embodiment of the present invention, FIGURE 1 further discloses a main memory 30 which may comprises a multi-plane coincident curernt core storage unit of the form described in the copending application of Henery W. Schrimpf, filed Jan. 25, 1957, bearing Ser. No. 636,256, now Patent No. 3,201,762. Access to the main memory 30 from a control memory 32 may be provided by a multi-stage main memory address register 34 which contains the address of the location within memory being referenced. Associated therewith is an auxiliary register 36 whose function it is to increment, decrement or transmit unchanged the contents of address register 34 into a designated area of control memory 32. Information enters and leaves the main memory locations addressed by register 34 via a main memory local register 35 which also generates pertinent checking information on the data being brought into memory and rechecks the data as it is withdrawn.

Included in the control memory 32 are a plurality of multi-position storage registers each of which stores information pertinent to the processing for various program instructions. In this respect, all the program instructions are processed through the control memory which selects, interprets and executes these in order. In performing these functions, the control memory 32 coordinates the various activities of receiving data, effecting an inter-memory transfer within the central processor, and transferring processed data to the various peripheral devices. The plurality of locations within the control memory 32 are addressed through a control memory address register 38. Information is transferred into the control memory from either the auxiliary address register 36 or the arithmetic unit 11, by way of a special auxiliary register 40. In addition, the control memory is capable of transferring any of its words into the main memory address register 34 for control thereof. In a preferred embodiment of the present invention there are included in the control memory repertoire A and B address registers, sequence and co-sequence registers, and present and starting location registers associated with each of the various read-write channels.

The arithmetic unit 11 is basically composed of an adder 42 capable of performing both binary and decimal arithmetic which may take the form for such registers as described in the text of R. K. Richards entitled "Arithmetic Operations in Digital Computers," D. van Nostrand Co., 1955. Two operand storage registers 44 and 46 are operatively connected to the input of adder 42 and provide means for storing the A and B operand data during the processing of program instructions. Two additional registers 48 and 50 are provided for storing the operation code and the operation code modifier. The operation code, which will hereinafter be referred to more simply as the OP code, defines the fundamental operation to be performed by the instruction. The OP code modifier, or variant character, is used to extend the definition supplied by the OP code.

The arithmetic unit 11 is further provided with a special clock and sequence cycle register 52 with is activated in accordance with the activate of the arithmetic unit itself. It is to be noted that, as regards the present invention, in the processing of a program instruction involving a peripheral device, the arithmetic unit is utilized to identify the nature of the instruction and define the parameters involve. The operation of the arithmetic unit 11 is in turn synchronized with the operation of the peripheral interface 13 and the associated peripheral equipment such that priority of processing is granted to the latter. In this respect, the apportioning of memory cycle time intervals between the arithmetic unit 11 of the central processor and the peripheral devices 22 through 29 is such that so long as peripheral demands are being generated for a particular read-write channel, the arithmetic unit is precluded from operating during that particular time cycle. Accordingly, the arithmetic clock and sequence cycle register 52 become operative only when a time interval allocated to a particular read-write channel is found not to be in demand by any of the peripheral devices.

The arithmetic clock and sequence cycle register 52, together with the OP code register 48 and the OP code modifier register 50, are connected to a subcommand decoder unit 51. The subcommand decoder 51 is in turn operatively connected to adder 42 and is further connected to the peripheral interface 13 and the memory portion 10 to thereby define the sequence of activities during the extraction phase of an order.

The various operating registers associated with the memory portion 10 and the arithmetic unit 11 may take the form of a series of interconnected bistable devices having appropriate coupling circuits between the stages so that the registers may be operated in a serial fashion. A representative form of such a register will be found in the above-mentioned Schrimpf Patent No. 3,201,762. In the event optimum speed is a requirement, the registers may be operative in the paralel mode whereby the respective stages are simultaneously examined, in which event the registers may take the form for such registers as described in the text of R. K. Richards referred to above.

The ability of the present invention to process a stored program simultaneously with the operation of a plurality of peripheral devices is in large part due to the functioning of the peripheral interface 13. The peripheral interface 13 consists primarily of a memory cycle distributor having a sequencing cycle consisting of a predetermined number of sub-intervals.

Figure 2:
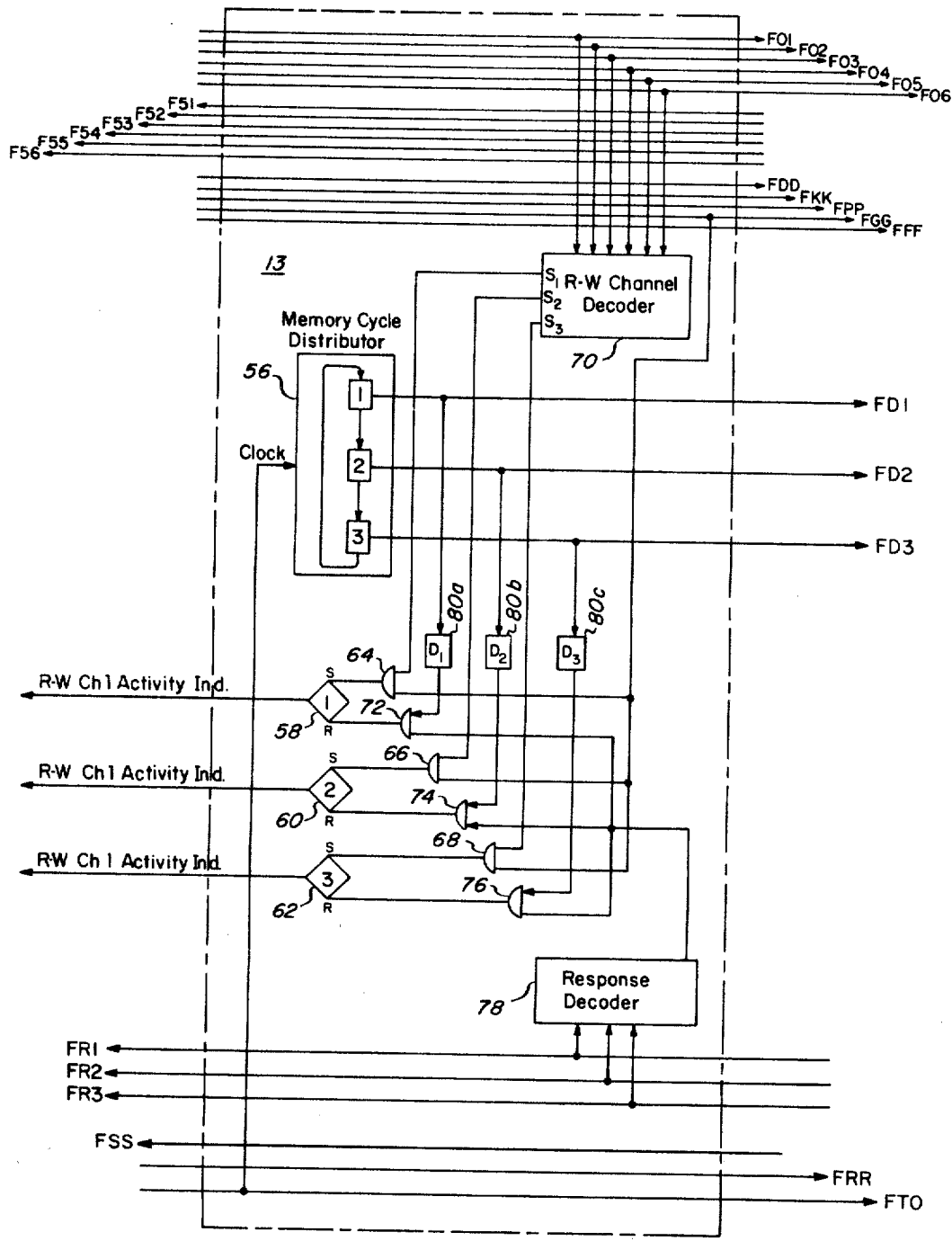
FIGURE 2 is a diagrammatic representation of the logic circuitry for implementing the activity of the memory cycle distributor of FIGURE 1.

The memory cycle distributor is thus essentially comprised of a cyclically operative sequencing circuit which successively allocates to each of a plurality of program-controlled read-write channels, a portion of an operative cycle. The memory cycle distributor may comprise a multi-stage ring counter which in turn may consist of a series of bistable devices connected such that at any one time, only one of the bistable devices is in a "set" condition. FIGURE 2 discloses a particular implementation of a preferred embodiment of a peripheral interface including a memory cycle distributor as constructed in accordance with the principles of the present invention. The memory cycle distributor of FIGURE 2 consists of a three-stage ring counter 56. Timing signals from the master clock 12 are used to synchronize the operation of the ring counter 56 so as to enable the "set" state to automatically progress from the first stage to succeeding stages in a time-ordered fashion so as to thereby establish three time-oriented signals FD1, FD2, FD3 on the output lines associated with the respective counter stages.

The peripheral interface 13 further includes activity indicators 58, 60 and 62 associated with each of the read-write channels to indicate whether or not a particular read-write channel is currently assigned. The operative function of the read-write channel activity indicators may be performed by a two-state device having "set" and "reset" inputs and appropriate means for indicating the operative condition of the device. A plurality of AND gates 64, 66 and 68 are operatively connected to the "set" inputs of the activity indicators 58, 60 and 62 respectively. AND gates 64, 66 and 68 are in part conditioned by signals from a read-write channel decoder 70 which takes the information off the data transfer lines F01–F06 to identify a particular one of the read-write channels as being assigned to a particular peripheral device. The conditioning of AND gates 64, 66 and 68 is completed by a control signal FGG indicating that read-write channel assignment information is presently being transfered to a particular peripheral control unit. Similarly, AND gates 72, 74 and 76 are operatively connected, through delay means 80$_a$, 80$_b$ and 80$_c$, to the reset input of activity indicators 58, 60 and 62 respectively. AND gates 72, 74 and 76 are in turn conditioned by an end-of-order signal generated within a response decoder 78.

As will hereinafter be developed, the end-of-order signal, as detected by response decoder 78, is generated within the peripheral control unit upon detection of a signal representation indicating that a particular data transfer instruction has been completed. It will also become apparent that the transfer of the response signals through the peripheral interface 13 will be initiated by one of the time-oriented signals FD1, FD2 or FD3 associated with the particular read-write channel being reset. Since this same signal is combined in an AND gate 72, 74 or 76 with the output of response decoder 78, delay means 80$_a$, 80$_b$ and 80$_c$ are provided to ensure that the end-of-order response signal is in synchronization with the further conditioning signal generated on output lines FD1, FD2 or FD3.

As mentioned above, in regards to FIGURE 1, the peripheral interface 13 is serially connected to the plurality of peripheral control units 14–21 by means of a common distribution line 54. The common distribution line 54 further comprises a plurality of electrical leads including data output lines F01–F06 (FIGURE 2) which transfer information from the central processor, through the peripheral interface 13, to the peripheral devices 22–29 associated with the respective peripheral control units 14–21. Similarly, data input lines F51–F56 (FIGURE 2) are utilized to transfer information from the peripheral devices 22–29 through the respective peripheral control units 14–21 (FIGURE 1) and the peripheral interface 13, to the main memory 30. Channel inquiry lines FD1–FD3 transfer the read-write channel activation signals from the peripheral interface 13 to the peripheral control units 14–21 to thereby identify a memory cycle sub-interval allocated to a preconditioned peripheral control unit 14–21.

A plurality of control lines FDD, FKK, FPP, FGG and FFF are selectively activated in conjunction with the data output lines F01–F06 to identify the nature of data being transferred to the various peripheral control units during the processing of a peripheral data transfer instruction. Response lines FR1–FR3 return selectively coded data through the peripheral interface 13 to indicate whether or not a particular peripheral device, which has been allocated the succeeding memory cycle sub-interval, is desirous of communicating with main memory during that particular sub-interval and, if so, the nature of the communication therewith. In addition, leads FTO, FSS, FRR are provided to transfer timing signals, initiate status checks and effect a clearing operation within the peripheral control units 14–21.

Figure 3:
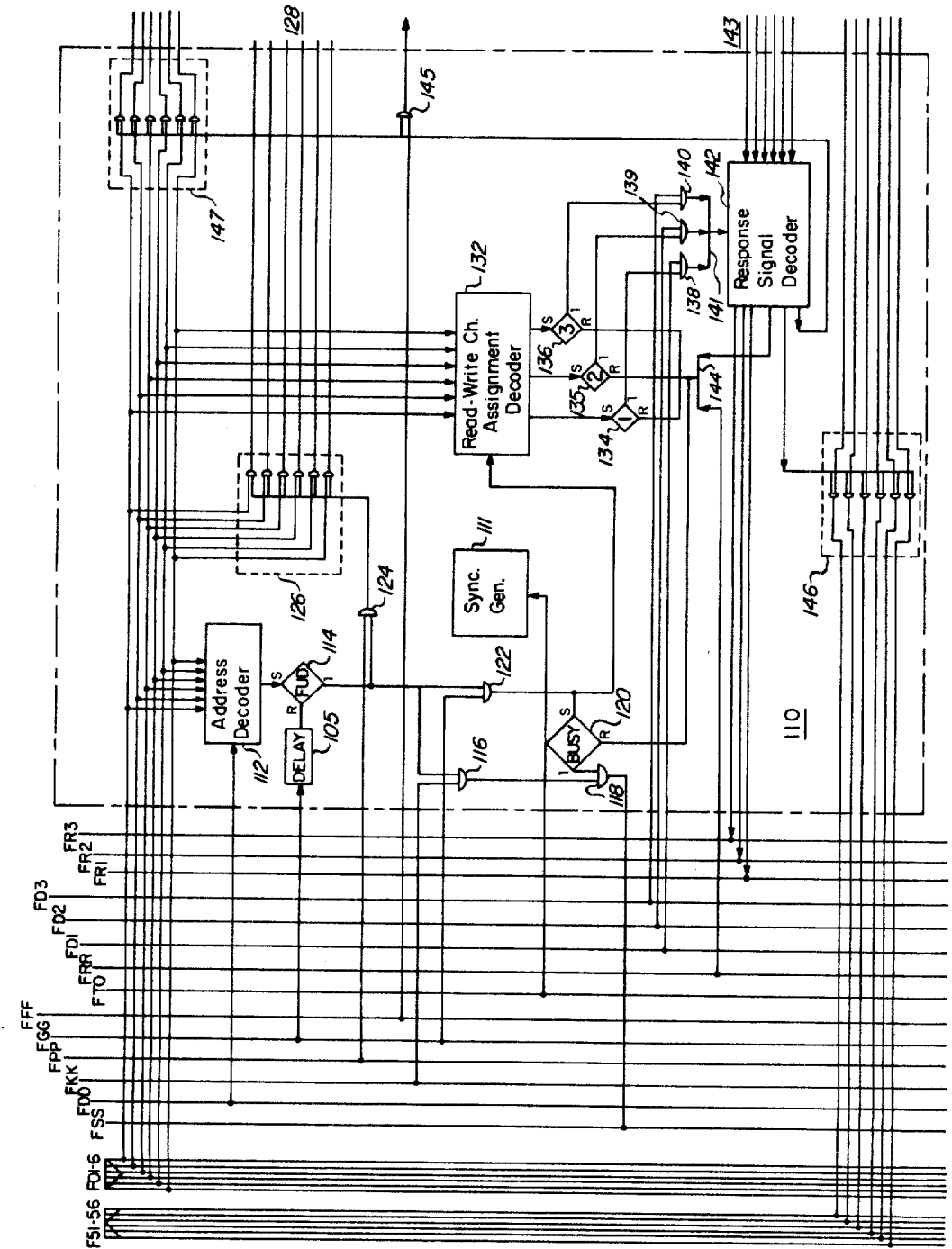
FIGURE 3 is a diagrammatic representation of the logic circuitry of a peripheral control unit constructed in accordance with the principles of the present invention.

Each of the control units 14–21 is equipped with appropriate circuitry to receive and interpret the above signals; however, before going into the details of a peripheral control unit as disclosed in FIGURE 3, a preliminary discussion of the above-outlined system will be initiated. In this respect, the preferred embodiment of the present invention involves a character machine in which a single multi-bit character is transferred between main memory 30 and a particular one of the peripheral devices $PD_n$ during each of the memory cycle sub-intervals. The processing of an instruction involving the transfer of data between the main memory 30 and the peripheral devices 22–29 occurs in two operative steps; namely, the characters of the instruction are first extracted from main memory, whereafter the information transfer is executed. As mentioned above, priority of processing is granted to the peripheral devices so that if a peripheral device wishes to communicate with main memory 30 during one of the memory cycle sub-intervals, a demand is generated within the associated peripheral control unit and returned to the central processor through the peripheral interface 13 on lines FR1–FR3. This demand is generated during the operative cycle immediately preceding the memory cycle sub-interval associated with the read-write channel on which the transfer is to be effected. If a memory cycle sub-interval associated with a particular read-write channel is not in demand, the time may be used to extract a single character of a program instruction from main memory 30.

As mentioned above, the peripheral data transfer PDT instruction is utilized to effect the transfer of information between the main memory and a peripheral device. The format of a typical PDT instruction may be as follows:

$$F/A/V/C_1 \ldots C_n$$

where $F=$ the OP code which defines the fundamental operation to be performed, $A=$ the address field which indicates the starting location of the operand field in the main memory and may be comprised of a plurality of characters, $V=$ the variant character which modifies the OP code to thereby extend the definition implied thereby.

$C_1 \ldots C_n=$ control characters which define parameters pertinent to a particular transfer operation.

In any programmed operation, the first step is to remove from memory the next instruction to be processed. Thus, as an instruction is processed, the characters of the instruction are transferred one by one out of successive main memory locations into the various operational registres of the central processor and control memory. In this respect, the extraction of an instruction is initiated with the instruction data contents of a location in main memory being specified by the sequence register of the control memory 32, after which the data is placed in the OP code register 48 and the sequence register is incremented.

In accordance with the nature of the operation of the subject system, the OP code or F character, which designates the type of operation to be performed, it actually brought out of main memory and deposited in sequence register of control memory 32 during the termination of the extraction phase of the preceding instruction. More specifically, during the extraction phase of the processing of an instruction, each character is brought out of the main memory 30, in sequence, until a character with an accompanying punctuation bit is detected. Detection of the punctuation bit identifies the last character read out as the OP code of the next succeeding instruction, thereby signalling the termination of the extraction portion of the program instruction presently being processed.

After the processing of the F or OP code character, the sequence counter within control memory 32 contains the address of the next character to be extracted. This character is temporarily deposited in the register 44 whereafter it is retransferred to the A address register of control memory 32. The sequence register of control memory 32 is then incremented and the succeeding characters of the A address field are brought out and deposited in the A address register as outlined above.

As mentioned above, the A operand specifies the location in main memory at which the data transfer is to begin. The next character to be extracted is the V character, which designates the read-write channel to be used and the characteristics thereof. As the V character is extracted and the identity of the read-write channel specified thereby is established, the information from the A address field is transferred to the associated read-write channel's "starting location" and "present location" registers of control memory 32. Information stored in the starting location counter will remain stored therein, serving as a point of reference throughout the processing of a particular row of information of the peripheral data transfer order. In contrast, the information stored in the present location register of control memory 32 will be incremented, decremented, or will remain the same in accordance with the sequencing of the main memory address register 34, as outlined above.

$C_1$ of the control characters is the next character of the instruction to be extracted, and designates the peripheral control unit being addressed. In subsequently available memeory cycle sub-intervals, the characters $C_2 \ldots C_n$ are successively read out of main memory 30 and sent to the peripheral control unit via output lines F01–F06. These characters specify to the peripheral control unit the control information required during the data transfer, such as the format to be followed in a printout operation. As mentioned above, the processing of control characters is terminated upon the detection of a particular punctuation mark in combination with the first character of the next program instruction to be subsequently extracted from main memory.

Figure 4:
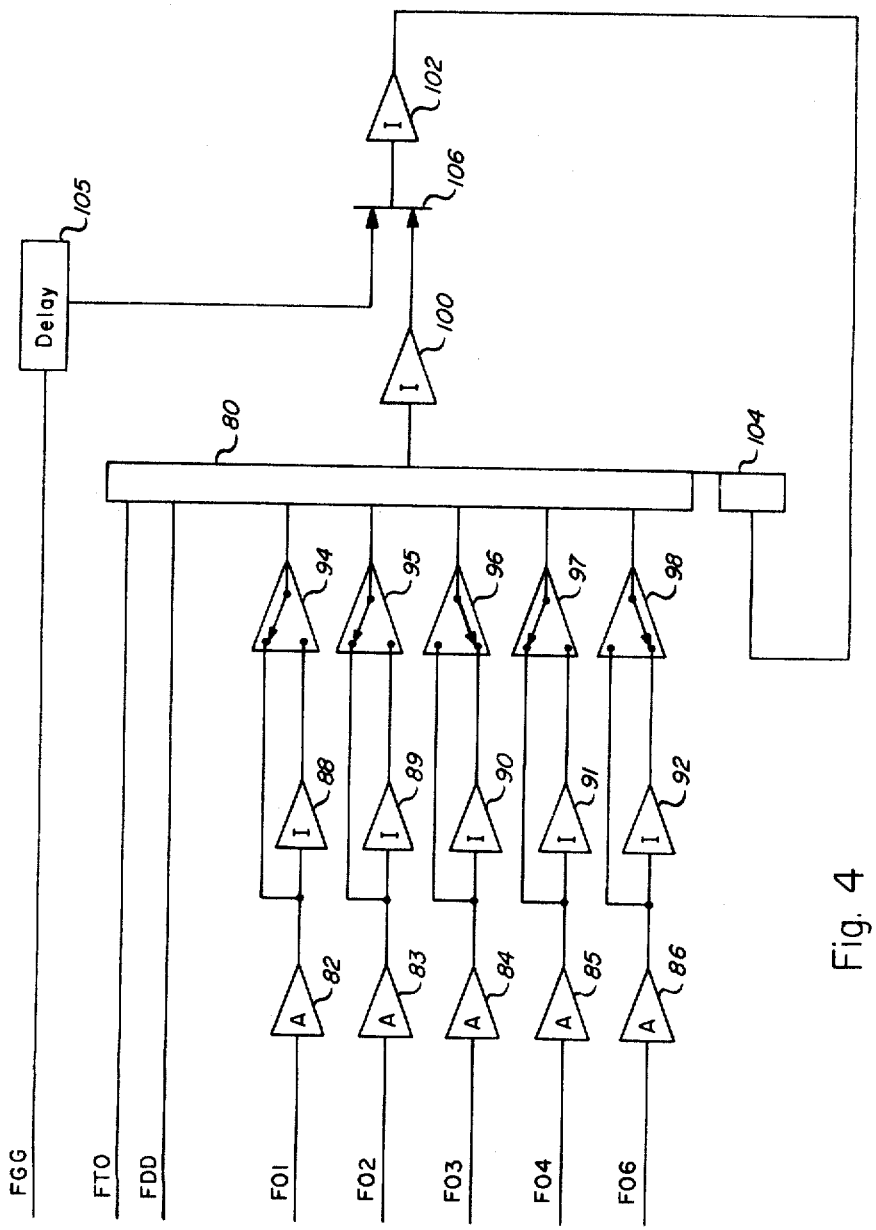
FIGURE 4 is a diagrammatic representation of the logic circuitry for implementing the addressing of the peripheral control unit of FIGURE 3.

Each of the peripheral control units 14–21 includes means which become operative upon receipt of an activation signal from the central processor, indicating a desire to communicate between main memory 30 and one of the associated peripheral devices 22–29. Reference is now made to FIGURES 3 and 4 which disclose a data representation of a preferred embodiment of a particular one of the peripheral control units 14–21 and the specific logic for effecting the selection of a particular one of the control units 14–21 by designating the control unit address thereof.

Referring first to FIGURE 4, there is shown an AND gate 80 conditioned by a plurality of input signals including a timing signal FTO generated in the master clock unit 12 of FIGURE 1. Signal FDD, transferred from a central processor through peripheral interface 13, identifies the information presently being transferred from main memory 30 on the output data lines F01–F06 as being address-oriented and therefore pertinent to the conditioning of AND gate 80. After being amplified in members 82–86, inputs signals F01–F06, which in themselves define a binary coded address, are alternatively shunted around, or channeled through, inverters 88–92 by selectively switching, or otherwise connecting, the circuit of one or the other of the connecting leads within select means 94–98. The selective switching is effected in accordance with the address associated with each of the particular peripheral control units. Thus, the switches are prepositioned to ensure that the proper conditioning signal will be delivered on all of the inputs to AND gate 80. In this manner, each of the peripheral control units 14–21 is made responsive to a particular coded address.

Upon conditioning of AND gate 80, inverter 100 is activated and the output signal therefrom in turn activates a second inverter 102. In addition to AND gate 80, AND gate 104 is also operatively connected to the input of inverter 100 and is conditioned by a feedback signal from inverter 102. The purpose of inverter 102 and the AND gate 104 is to sustain the operative duration of inverter 100 until a signal is detected indicating that the extraction portion of the particular data transfer instruction involving the associated peripheral unit has been completed. Accordingly, the control signal FGG, after being temporarily delayed in member 105, is transferred to gating means 106. The presence of the delayed FGG signal in combination with an output from inverter 100, terminates conduction within inverter 102, thereby effecting the removal of the conditioning signal from the input to gate 104 which further terminates conduction within inverter 100.

Reference should now be made to FIGURE 3 which discloses, in outline form, a peripheral control unit 110 with the leads constituting the common distribution circuit 54 of FIGURE 1 disclosed therein as leading into the topmost control unit 14 from the peripheral interface 13 and thereafter threading through the other peripheral control units 15–21. Shown here is a timing device 111 which is synchronized by a signal on control line FTO. It is to be understood that timing signals are generated herein and distributed to the various members of the control unit 110; however, in an effort to reduce unnecessary circuitry, these connections have not been shown as actual leads in the diagram of FIGURE 3.

The address decoder 112, in combination with flip-flop 114, constitute the subject matter of FIGURE 4 discussed above. Once set, flip-flop 114 remains set during the duration of the extraction cycle of the processing of a peripheral data transfer instruction. Thus, although the information being transferred from the central processor through the peripheral interface is distributed through each of the peripheral control units 14–21 of FIGURE 1, only the particular peripheral control units having had its address flip-flop 114 set by the preceding address character will attempt an interpretation of the information.

The output of flip-flop 114 is connected as a conditioning lead to AND gate 116, the latter being further conditioned by a signal from control lead FKK. The output of AND gate 116 is in turn connected to AND gate 118 which is further conditioned by an output from flip-flop 120. The output of still another AND gate 122 is used to switch flip-flop 120 to its "set" condition, AND gate 122 in itself being conditioned by an output signal from flip-flop 114 and a signal on control line FGG.

The output of flip-flop 114 is also connected as a conditioning signal to AND gate 124 which is also conditioned by a signal from control line FPP. The output of AND gate 124 is further used to condition gating means 126 to thereby enable certain parameters pertinent to the data transfer instruction being processed to be transferred a character at a time, via lines 128, to an associated peripheral device, not shown. The transfer of parameters continues so long as the control signal FPP is present in combination with an output indicating flip-flop 114 is in its set state, to thereby condition AND gate 124.

FIGURE 3 further discloses the output of AND gate 122 as being connected to the input of a read-write channel assignment decoder 132 which takes information off the data transfer lines F01–F06 to identify to the peripheral control unit, the read-write channel to be associated with the processing of a particular data transfer instruction. The read-write channel assignment signal from decoder 132 is effective in setting one of three flip-flops 134, 135 and 136 so that subsequent channel inquiry signals, as generated on lines FD1–FD3, will be gated through AND gates 138, 139 and 140 respectively and thereafter buffered in OR gate 141, whereafter the output signal thereof is in turn utilized to initiate the transfer of response signals from the response signal storage and decoder member 142. As mentioned above, the response signals are generated in the associated peripheral device and enter the decoder 142 via lines 143. In response to a gating signal from OR gate 141, the response signals are transferred from decoder 142, through the peripheral interface 13, to the central processor on lines FR1–FR3, to indicate whether the next succeeding memory cycle sub-interval as allocated to this particular peripheral device is to be utilized or not and, if so, what the nature of the transfer is to be.

An end-of-order response signal, as detected in the response storage and signal decoder member 142 in addition to resetting the associated read-write channel activity indicator within the peripheral interface 13, as described above in connection with FIGURE 2 will also initiate an output which is buffered through OR gate 144 to thereby effect the resetting of flip-flops 134, 135 and 136 associated with the read-write channel assignment decoder. In addition, the end-of-order response signal will also reset flip-flop 120 to show that the associated peripheral control unit is no longer busy. Gating means 146 and 147 are shown as connecting the data input and output lines to the peripheral device or devices associated with the peripheral control unit. These gating means are conditioned by the various response signals, as decoded within member 142, to ensure that information will be transferred between the peripheral device and the main memory only during the assigned memory cycle sub-interval. In this respect, since the read-write channel inquiry signal entering decoder 142 does so during the sub-interval immediately preceding the memory cycle sub-interval allocated to the read-write channel associated with the program instruction presently being processed, a sufficient delay must be established within decoder 142 to ensure that the output signal to gating means 147 will be in proper synchronization with the information appearing on lines F01–F06.

Since the various peripheral devices are all connected in common through the associated peripheral control units and the peripheral interface 13, there may be information on the data output lines F01–F06 at all times; however, none of the information on lines F01–F06 will be meaningful to the various control units except in the presence of a control signal directed to a particular one of the control units. It should be apparent from the above that these control signals will include FKK, FPP and FGG, in combination with the address signal FDD or its derivative FUD, as stored in flip-flop 114. The above signals are active during the extraction phase of a peripheral data transfer instruction and are supplemented by the signals FFF and FD1–FD3 which effect control of the peripheral control unit during the execution phase of a data transfer instruction.

As mentioned above, the resetting of address flip-flop 114 is effected by a delayed signal from control lead FGG, the signal being delayed sufficiently in delay member 105 to ensure that the other actions initiated by the FGG signal and dependent upon the flip-flop 114 being in its set condition will be completed before the address flip-flop 114 is switched to its reset condition. It has also been indicated above that a clearing operation of the peripheral control units may be initiated by the console operator by directing a signal on control line FRR of FIGURE 3. As shown here, the signal FRR is buffered through OR gate 144 to reset flip-flops 120, 134, 135 and 136.

The operation of the peripheral interface of FIGURE 2 and the peripheral control unit of FIGURE 3 will best be understood in terms of an illustrative example of a peripheral data transfer instruction ecected in accordance with the operative routine depicted by the extraction and execution timing charts of FIGURES 5a and b respectively. Thus, in a card read operation, as a memory cycle previously allocated to a particular read-write channel goes unused, the OP code of the peripheral data transfer instruction, as specified by the sequence register of the control memory 32, is transferred to the OP code register 48 of FIGURE 1, whereafter the sequence register is incremented. As a subsequent memory sub-interval is made available to the processing of the characters of the instruction in the arithmetic unit 11, the A address field information contained in the memory location specified by the sequence register, as incremented, is placed in the A address register of the control memory 32 to thereby identify the location in main memory at which the data transfer is to begin. Again, the sequence register of control memory 32 is incremented so that as the succeeding memory cycle sub-interval is made available to the arithmetic unit, the V characteris transferred from main memory to the OP code modifier register 50. The V character specifies the control memory address of the read-write register to be used in the execution of the data transfer instruction. As soon as the read-write channel specified by the V character is available, the information identifying the starting location of main memory, that is, the information contained in the A address register of control memory 32, is placed in both the current address register and the starting address register of control memory 32 associated with the read-write channel specified by the V character.

The extraction of the foregoing characters is actually preliminary to the designation of the particular peripheral control unit and its associated peripheral device which are to be utilized in the processing of the peripheral data transfer instruction. The $C_1$ character, which is extracted from main memory 30 during the next available memory cycle sub-interval, specifies the peripheral control unit through which the transfer is to be effected. In this respect, the extraction of the $C_1$ character effects the generation of a signal on control line FDD which is fed to the address decoder 112 of each of the peripheral control units 14–21 so that, in combination with the information on data output lines F01–F06, the flip-flop 114 of the addressed peripheral control unit will be "set" in the manner outlined above for FIGURE 4. The switching of flip-flop 114 into its "set" condition initiates an output, of a voltage level here identified as a binary one, which conditions one side of AND gate 116. The other side of AND gate 116 is connected to control line FKK, which is now actuated to initiate a status check of the addressed peripheral control unit. Thus, the output of AND gate 116 will be gated through the associated AND gate 118 provided that flip-flop 120 is in its "set" state, indicative of a busy condition within the addressed peripheral control unit. If not busy, the output of flip-flop 120 will be "low" so that AND gate 118 will not be properly conditioned and the signal on line FSS, as sensed by the central processor, will indicate that the addressed peripheral control unit is not busy. If the addressed peripheral control unit is busy, the calling program is stalled pending the release of the particular peripheral control unit. As mentioned above, the resetting of flip-flop 120 to signal the release of a temporarily stalled program will be effected by the detection of an end-of-order signal in the response signal storage and decoder member 142 of FIGURE 3.

As soon as the control unit specified by character $C_1$ is available, the characters $C_2$–$C_n$ are successively read out as successive memory cycle sub-intervals are made available to the arithmetic unit. As mentioned above, characters $C_2$ through $C_n$ contain information pertinent to the processing of the particular data transfer instruction and may include information such as the address of a particular tape drive to be utilized in a tape read or write instruction, or the number of columns of data to be printed in a printing operation.

As mentioned above, the transfer of the parameters to the programmed peripheral device continues so long as the control signal FPP appears at the input to AND gate 124. The parameter transfer is terminated upon the detection of a particular punctuation bit accompanying a character of information being extracted from the main memory 30. As soon as the punctuation bit is detected signalling the completion of the extraction phase, a signal is generated on control line FGG which is combined with input signals to the read-write channel assignment decoder 132 to thereby set flip-flop 134, 135 or 136, so as to identify to the addressed peripheral control unit the read-write channel to which it has been assigned for the execution of the data transfer instruction. In addition, the signal FGG is effective in setting flip-flop 120, thereby indicating that the peripheral control unit being addressed is now busy. The FGG signal is also delivered to member 105 wherein it is delayed sufficiently to enable the foregoing operations to be completed before resetting address flip-flop 114.

Referring once more to the timing charts of FIGURE 5a, it is seen that the four extraction cycle signals FDD, FKK, FPP and FGG are generated in each of four successive memory cycle sub-intervals. It must be remembered that these memory cycle sub-intervals are successive insofar as processing within the arithmetic unit goes. However, since the arithmetic unit is allocated whatever memory cycle sub-intervals are not demanded by the peripheral control unit during the execution phase of other peripheral instructions, these "successive" time cycles will not necessarily be successive in terms of absolute time. It is further apparent, with reference to FIGURE 5a, that the bus output lines F01–F06 carry meaningful information during each of these "successive" operative cycles of the arithmetic unit. Also, status signal FSS is synchronized with control signal FKK so as to return a signal to the central processor indicative of the operative condition of the addressed peripheral control unit during the extraction phase of the processing of a programmed instruction. It is further apparent from FIGURE 5A that the output of the unit address flip-flop of the peripheral control unit, actually addressed by signal FDD, will be activated and remain activated until terminated by the reception of the control signal FGG, indicating the termination of the extraction phase. In like manner, receipt of the signal FGG also is effective in setting "status" flip-flop 120 to its busy condition, the latter remaining "set" until the termination of the execution phase of the peripheral data transfer instruction.

Reference is now made to FIGURE 5b which concerns the timing chart for the execution phase of peripheral data transfer instruction. In accordance with the implementation of the system as outlined above, it is possible to transfer a single character of information between memory and the addressed peripheral control unit once every memory cycle; i.e., in the preferred embodiment of the present invention, once every three memory cycle sub-intervals. It has also been stressed that not every memory cycle sub-interval so allocated will be utilized by the peripheral device receiving or transferring the information. However, for purposes of continuity, the timing diagram of FIGURE 5b discloses transfers of information as being effected in successive memory cycle sub-intervals allocated to read-write channel 2.

As mentioned above, preliminary to the transfer of a character of information, a channel inquiry signal is directed to the peripheral control unit allocated the succeeding memory cycle sub-interval. Thus, during memory cycle sub-interval 1, a channel inquiry signal is directed to the addressed peripheral control unit on lines FD1–FD3 of FIGURE 3. Accordingly, a response is generated within the response signal storage and decoder member 142 and returned on lines FR1–FR3.

Included in the response repertoire of the preferred embodiment of the subject system are coded representations indicating that no action is desired to be taken during the subsequent operative cycle of that particular read-write channel and that the allocated time should be given to the central processor arithmetic unit for the processing of a character of a program instruction or other arithmetic operation. Alternatively, the response signals may indicate a frame-output or frame-input demand, which initiates the reading or writing, to the peripheral control unit or the central processor memory respectively, of a new frame of data, with or without the incrementing or decrementing of the main memory address register 34. The response signal may also be in the form of a row demand which resets the current address register of the associated read-write channel and control memory 32 to the representation stored in the associated starting address register thereof.

The response signal may also appear as an end-of-order response signal which indicates to the associated peripheral control unit that the processing of the instruction, and the data transfer itself, have been completed. In the preferred embodiment of the present invention this indication is effected aby resetting the "busy" flip-flop 120 of the peripheral control unit 110. The end-of-order response signal is also effective in releasing the associated read-write channel by resetting the respective activity indicator located in the peripheral interface 13 of FIGURE 2. Referring briefly to FIGURE 2, it is seen that response decoder 78 generates an output in response to the end-of-order signal, the output signal of decoder 78 in turn arrives at the input of AND gates 72, 74 and 76 in synchronization with a delayed signal from that stage of counter 56 which, during the immediately preceding memory cycle sub-interval, was in its set condition. The output of the conditioned one of AND gates 72, 74 or 76 is thus effective in resetting the associated flip-flops 58, 60 or 62 to thereby indicate the release of that particular read-write channel.

Referring again to FIGURE 5b, therein are shown time slots associated with bus output and but input signals F01–F06 and F51–F56 respectively. Although the bus output and but input time slots are present during each of the memory cycle sub-intervals, information will be transferred between the peripheral device associated with the address peripheral control unit and main memory only during the assigned memory cycle sub-interval and then, only if the response signals generated during the preceding sub-interval indicate that the peripheral device is ready for the transfer of a character of information. More specifically, during each memory cycle sub-interval immediately preceding the sub-interval associated with the read-write channel assigned to the processing of the particular peripheral data transfer instruction of this example, that is, read-write channel 2 in the present instance, a channel inquiry signal is directed to the addressed read-write channel and the response lines interpreted to ascertain whether or not the succeeding memory cycle sub-interval is to be utilized in the processing of a character of information through the addressed peripheral control unit. If the response signals, as interpreted in member 142, indicate that the peripheral device is ready to transfer a character of information, signals are generated on the lines connecting member 142 to gating means 146 and 147, thereby enabling the information on the data output or input lines to be transferred accordingly.

As mentioned above, immediately upon completion of the extraction phase of the PDT instruction of the present example, the arithmetic unit was again made available to process central processor orders or other program instructions. Accordingly, if the response signals returned on lines FR1–FR3 indicate that no action is to be taken during the next operative sub-interval allocated to the read-write channel associated with the program instruction of this example, the sub-interval will be made available to the arithmetic unit. Alternatively, a frame demand may be generated on response lines FR1–FR3 which requests that the next character of information be permitted to be transferred from the card reader. As indicated, this data transfer will take place during the memory cycle sub-interval assigned by the memory cycle distributor to the read-write channel processing the instruction. Accordingly, a character of information will be read off of data input lines F51–F56 and placed in the location of main memory 30 as specified by the information in the read-write present location counter of control memory 32, whereafter the present location counter will be incremented. In this manner, the processing of the card read instruction of this example continues until all the information has been read into the specified locations of main memory.

If instead, the system were in the process of executing a card punch operation, the transfer of information from main memory to the card punch would continue until a particular punctuation bit associated with the data being transferred was detected, thereby indicating the completion of the execution phase and of the instruction itself. The detection of the particular punctuation bit signalling the completion of the execution phase of the card punch instruction is effective in generating a control signal FFF which is combined in AND gate 145 with a signal taken from the line connecting the response signal decoder 142 with gating means 147. The output of AND gate 145, as transferred to the associated peripheral device, is effective in generating an end-of-order response signal which resets the read-write channel assignment decoder flip-flops 134, 135 and 136, and also the status indicator flip-flop 120, as depicted in the timing diagram of FIGURE 5b. The termination of the card read instruction outlined above, is effected in a similar manner; however, therein the end-of-order response signal is generated by the peripheral device when it has ascertained that the information transfer is complete.

It should be readily apparent from an understanding of the mode of operation of the above-outlined system that, although priority of processing time is allocated to the peripheral devices, the actual use time of the memory cycle sub-intervals allocated to a particular programmed peripheral device is so small that the execution of central processor orders in the arithmetic unit is in no way impaired. As an example, it can be shown that in the processing of a card punch instruction, the percentage of the unused memory cycle sub-intervals necessary to effect the transfer of a charatcer of information is on the order of ninety-nine percent (99%). Although the ratio of unused to available memory cycle sub-intervals will vary in accordance with the nature of the programmed peripheral device, sufficient time will be available to the processing of central processor orders to ensure that the main program is not sidetracked if all the read-write channels are busy.

As mentioned above, one embodiment of the present invention is provided with an auxiliary read-write channel which permits a less active peripheral device to be relegated to an auxiliary channel which is scanned less frequently than the other regular read-write channels. It is thus possible for the less active peripheral devices to communicate with the main memory without tying up a channel to the exclusion of faster and more active peripheral equipment. To effect this mode of operation, the system may be implemented so that a selected one of the auxiliary channels is scanned during alternate time cycles originally allocated to a specific one of the plurality of read-write channels.

The auxiliary channels are similar to the regular read-write channels in that each of the auxiliary channels comprises a pair of storage registers located in the control memory 32 which store information identifying the area of main memory currently being addressed. The memory cycle distributor associated with the regular read-write channels is supplemented by one or more bistable devices which are synchronized with counter 56 of the memory cycle distributor of FIGURE 2, and which identify the mode of operation of a particular one of the read-write channels as being regular or auxiliary. Means are also provided to enable each of the auxiliary channels to be selectively employed.

FIGURE 6 discloses the logical means necessary to the implementation of the auxiliary read-write channel concept and, in particular, discloses the ring counter 56 of FIGURE 2 supplemented by a two-state device 148, which may be a two-stage counter similar to that described above. In this embodiment, timing signals from the master clock 12 (FIGURE 1) may be reduced, by means not shown, to effect an operative cycle within ring counter 148 of twice that of counter 56 so that stage 1 of counter 148 remains in a "set" condition, while counter 56 generates signals $FD_1$, $FD_2$ and $FD_3$. Thereafter, counter 148 switches to its second operative state and remains so "set" until counter 56 completes another one of its operative cycles. The output signal generated from stage 2 of counter 148 is used as an input to AND gates 150, 151 and 152 which are further conditioned by signals $FD_1$, $FD_2$ and $FD_3$ respectively.

A plurality of interlocks 154 through 156 are provided to enable each of the auxiliary channels to be selectively employed. These interlocks may take the form of an ordinary bistable device having a "set" and a "reset" state. When a particular interlock is "set," it prevents the associated one of the auxiliary read-write channels from being activated, thereby reserving the operating time to the use of the regular read-write channel associated therewith. To effect this operation, the assertion output from each of the flip-flops 154 through 156 are connected as conditioning leads to their associated AND gates 150, 151 or 152.

If, in an operative routine, it is desired to operate with read-write channel 1 being allocated all of the time cycles so as to exclude the operation of auxiliary read-write channel 1, the interlock 154 is placed in its "set" condition. Thus, with interlock 154 set, when stage 1 of counter 56 is in its set condition, and stage 2 of counter 148 is "set," AND gate 150 is conditioned on such that as the output signal $\overline{FDX}$ thereof goes "up," the output signal FDX of an associated inverter 157 goes "down" to ensure that regular read-write channel 1 operates in an uninterrupted mode.

In an operative routine wherein all interlocks are "reset" so as to permit sampling of the auxiliary channels, the distribution of sampling periods would be 1–2–3—1A–2A–3A—1–2–3 . . . If now one or more of the interlocks are "set," say, the interlock associated with the second auxiliary channel, the sampling period would be 1–2–3—1A–2–3A—1–2–3 . . . It is apparent from the above that on the basis of a 6-microsecond cycling period for counter 56, channels 1, 3, 1A and 3A would be sampled every 12 microseconds, and channel 2 every 6 microseconds.

It is possible to extend the concept of auxiliary read-write channels to provide auxiliaries of the auxiliary channels and even auxiliaries of the auxiliaries. Reference is now made to FIGURE 7 which discloses in diagrammatic form means for providing auxiliaries of both the regular and auxiliary channels. In this embodiment, sampling of the regular and auxiliary read-write channels is effected in accordance with the operative routine outlined in connection with FIGURE 6, with further means being provided to enable the sampling of additional auxiliaries associated with both the regular and auxiliary channels provided therein. Thus, the regular channel in addition to sharing its sampling periods with the auxiliary channels, also shares its allocated sampling periods with regular supplemented channels. Similarly, the auxiliary channels of FIGURE 6 share their allocated sampling periods with auxiliary supplemented channels.

Numeral 56 refers to the three-stage ring counter common to FIGURES 2 and 6, while numeral 148 identifies the two-state device of FIGURE 6. The counters 56 and 148 operate in a manner similar to that established with respect to FIGURE 6 and generate the signals FD1 through FD3 and signals FDX and $\overline{FDX}$ accordingly. In addition, a second two-stage device 149 is operative in the same manner as the counter 148, having one-half the cycling speed thereof, and is also of different phase. Thus, as counter 148 switches its "set" condition from stages 1 to 2, counter 149 simultaneously switches its "set" condition from stage 2 to stage 1, or alternatively from stage 1 to stage 2. However, switching of counter 149 occurs only when counter 148 switches its set condition from stage 1 to 2. The reason for this latter restriction will become apparent from an understanding of the operation of the channel distributor which follows. Associated with counter 149 are a plurality of AND gates 158 through 163 which are conditioned in part by signals $FD_1$, $FD_2$ and $FD_3$, as well as the negation and assertion signals $\overline{A}$ and A generated by counter 148, which indicate the nature of the allocated cycling; that is, whether it is regular or auxiliary, respectively. The signals A and $\overline{A}$ are selectively combined with output signal RS–AS of counter 149, to indicate whether a portion of the operative cycle is regular or auxiliary, or whether it is regular-supplemented or auxiliary-supplemented. Gates 158 through 160 further include inputs from interlocks 165 through 167 which, when "set," exclude the sampling of the supplemental read-write chanels associated with the respective regular read-write channel.

In an operative routine wherein it is desired to operate with regular read-write channel 1 being allocated the time cycles normally shared with the regular-supplemented read-write channel 1, interlock 165 is placed in its "set" condition. With interlock 165 set, and stages 1 of both counters 56 and 148 in a "set" condition, and with stage 2 of counter 149 in a "set" condition, AND gate 158 will be conditioned "on." As the output signal $\overline{FDS}$ of AND gate 158 goes "up," the output signal FDS of an associated inverter 171 goes "down" to indicate that, with respect to the regular-supplemented read-write channel 1, regular read-write channel 1 is operating in an uninterrupted mode.

In a similar manner, gates 161 through 163 are conditioned by the inputs from interlocks 168 through 170; signals FD1 through FD3; a signal indicating that stage 2 of counter 149 is in its "set" condition; as well as a signal indicating that stage 2 of counter 148 is in its "set" condition to thereby enable or preclude the sampling of auxiliaries of the auxiliary read-write channels in accordance with the status of the bistable devices registering the interlock condition of members 168 through 170.

In order to facilitate an understanding of the above-outlined embodiment of the present invention, the following table has been prepared listing the code combinations which effect the selection of read-write channel 1 of the regular, auxiliary and supplemented channel combinations.

FD1, $\overline{FDX}$, $\overline{FDS}$; signals the selection of read-write channel 1 of the regular channels.

FD1, FDX, $\overline{FDS}$; signals the selection of read-write channel 1 of the auxiliary channels.

FD1, $\overline{FDX}$, FDS; signals the selection of read-write channel 1 of the regular-supplemented channels.

FD1, FDX, FDS; signals the selection of read-write channel 1 of the auxiliary-supplemented channels.

It is possible to construct a second table indicating the conditioning signals needed to generate the above selections. Thus, in order to effect the selection of read-write channel 1 of the regular read-write channels, two conditions, in addition to the presence of an FD1 signal, are required. First, counter 148 must be operative with its first stage in a "set" condition so as to generate an FDX signal. And secondly, it is required that the time period alternately shared between the regular and regular-supplemented channels be presently allocated to the regular channel 1, thereby ensuring the generation of an $\overline{FDS}$ signal.

In somwhat similar manner to that outlined above for the sampling of read-write channel 1 of the regular channels, read-write channel 1 of the auxiliary channels is allocated a read-write channel sampling period upon the generation, during the FD1 sampling period, of an FDX and an $\overline{FDS}$ signal. The FDX signal designates the sampling cycle as being allocated to the auxiliary or auxiliary-supplemented channels and is generated upon conditioning of AND gate 150 by the combination of an FD1 signal, a signal indicating that stage 2 of counter 148 is in its "set" state, and the negation of an auxiliary interlock 1 signal indicating that sampling of the auxiliary channel 1 has not been precluded. The $\overline{FDS}$ signal indicates that as between the auxiliary and auxiliary-supplemented channels, counter 149 is cycled so as to ensure that the former condition is established.

In somewhat similar manner, a signal indicating the selection of read-write channel 1 of the regular-supplemented channels is generated by the combination of an FD1, an $\overline{FDX}$ and the FDS signal. A difference is to be noted here in that generation of an FDS signal is effected by the failure to activate AND gate 158. Accordingly, AND gate 158 is conditioned off by the combination of an FD1 signal; a signal indicating that counter 148 is operating with stage 1 in its set condition representative of the fact that the present sampling cycle has not been allocated to an auxiliary channel; a signal indicating that counter 149 is operative with its second stage in the "set" condition, thus indicating that the present operating cycle has been allocated to the supplemental channels; and finally, a signal indicating that supplemental interlock 1 has not been set, which, if "set," would preclude the regular-supplemented channel 1 from being periodically sampled.

A signal indicating the selection of read-write channel 1 of the auxiliary-supplemented channels is effected by the generation of the FD1 and FDX signals as employed in the selection of read-write channel 1 of the auxiliary channels outlined above, along with the FDS signal generated upon the conditioning off of AND gate 161. AND gate 161 is in turn conditioned off by the combination of an FD1 signal; a signal indicating the negation of an interlock 1 condition as established by interlock 165, and thus representative of the fact that the sampling of auxiliary-supplemented channel 1 has not been precluded by reserving the scanning cycles to the auxiliary read-write channel 1 exclusively; a signal from the set side of stage 2 of counter 148 indicating that the time cycle is presently allocated to an auxiliary read-write channel; and a signal from stage 2 of the counter 149 indicating that the latter is operative with the second stage in its "set" condition, thereby indicating that the present operaing cycle has been allocated to the auxiliary-supplemented channel.

In like manner, selection of channels 2 and 3 associated with the regular, auxiliary and supplemented channels may be effected by the generation of the selective FDX and FDS signals in combination with FD2 and FD3 signals respectively. In an operative routine whereby in all interlocks are reset so as to permit sampling of all the auxiliary channels, the distribution of sampling periods to the respective read-write channels would be effected in accordance with the following routine: 1–2–3—1A–2A–3A—1S–2S–3S—1AS–2AS–3AS—1–2–3 . . . If now one or more of the interlocks are set, say, interlock 155 as associated with the second regular read-write channel, interlock 165 associated with the first regular-supplemented channel, and interlock 170 associated with the third auxiliary channel, the distribution of sampling periods would be as follows: 1–2–3—1A–2A–3A—1–2S–3S—1AS–2S–3A—1–2–3 . . .

A further extension of the auxiliary read-write channel concept is seen in the embodiment of FIGURE 8 which discloses means for implementing the memory cycle distributor of FIGURE 2 to effect a modification of the auxiliary of the auxiliaries concept as discussed above with reference to FIGURE 7. In this respect, numeral 56 refers to the three-stage ring counter common to FIGURES 2, 6 and 7, while unmeral 148 refers to the two-state device common to FIGURES 6 and 7. Two additional two-state devices 172 and 174 are operative in the same manner as counter 148, but are provided with different cycling speeds and are of different phase. Thus, as counter 56 completes its first cycle such that the set condition of stage 3 reverts to stage 1, counter 148 switches its set state from the first to the second stage. After counter 148 has recycled to establish its "set" condition in stage 1, and counter 56 has thereafter completed an additional stepping sequence, both counters 148 and 172 switch their "set" condition from stage 1 to stage 2, meanwhile, counter 174 maintains its "set" condition in stage 1. Upon completion of the subsequent stepping sequence in counter 56, counters 148 and 172 re-establish their "set" condition in stage 1. After the completion of another sequencing cycle in counter 56, counter 148 again switches its "set" condition from stage 1 to stage 2 to thereby re-establish an auxiliary read-write channel operating period. After counter 148 has again recycled to establish its "set" condition in stage 1, and counter 56 has thereafter completed an additional stepping sequence, the "set" condition is transferred from stage 1 to stage 2 of counters 148, 172 and 174.

In order to synchronize the counters 56, 148, 172 and 174 so as to effect the transfer of the "set" condition from stages 1 to stages 2 of the various counters in the desired routine, the timing signals from the master clock 12 of FIGURE 1 are reduced to the relationship depicted on the clock input leads of FIGURE 8 by means not shown. Associated with counters 172 and 174 are a plurality of AND gates 176 through 178 and 184 through 186 respectively. AND gates 176 through 178 are conditioned in part by the signals FD1, FD2, FD3 generated within counter 56, as well as signals from the second stage of counters 148 and 172 which, when "set," and when further combined with a signal indicating that the associated one of the interlocks 180 through 182 is in its "set" condition, are effective in condition "on" the associated one of the AND gates 176 through 178. As the output signal $\overline{FDS}$ of the associated one of the AND gates 176 through 178 goes "up," the output signal FDS of an associated inverter 179 goes "down." In like manner, AND gates 184 through 186 associated with counter 174, are conditioned by signals FD1, FD2, FD3, as well as "set" signals from interlocks 188 through 190 and signals from stage 2 of counters 148 and 172, and from stage 2 of counter 174. Upon proper condition, the output of the associated one of the AND gates 184 through 186 goes up thereby generating output signal FDA and the output signal FDA of an associated inverter 191 goes down.

The following table indicates the operative relationship of the various signal lines of FIGURE 8 required to effect the selection of the first read-write channel of the regular, auxiliary, auxiliary-supplemented and auxiliary of the auxiliaries-supplemented channel combinations.

FD1, $\overline{FDX}$, $\overline{FDS}$, $\overline{FDA}$; signals the selection of the read-write channel 1 of the regular channels. On the basis of a 6-microsecond cycling period for counter 56, read-write channel 1 would be sampled once every 6 microseconds with interlock IX1 "set"; and once every 12 microseconds when interlock IX1 is "reset."

FD1, FDX, $\overline{FDS}$, $\overline{FDA}$; signals the selection of the read-write channel 1 of the auxiliary channels. Again on the basis of a 6-microsecond sampling period, read-write channel 1 would be sampled once every 12 microseconds with interlock IX1 "reset" and interlock IS1 "set"; and alternatively, once every 24 microseconds with interlocks IX1 and IS1 "reset."

FR1, FDX, FRS, $\overline{FDA}$; signals the selection of read-write channel 1 of the auxiliary-supplemented channels. The sampling period of read-write channel 1 of auxiliary-supplemented channels, with interlocks IX1 and IS1 "reset," and interlock 1A1 "set," would be once every 24 microseconds; and, alternatively, with interlocks 154, 180 and 188 reset, once every 48 microseconds.

FD1, FDX, FDS, FDA; signals the selection of read-write channel 1 o fthe auxiliaries of the auxiliary-supplemented channels. Sampling of the auxiliaries of the auxiliary-supplemented channels is predicated upon interlocks 154, 180 and 188 being in their "reset" condition, otherwise, if any one of these is in its "set" condition, sampling of the associated one of the auxiliary-supplemented channels is precluded. In the case where the interlocks are in the "reset" state, the sampling rate of the auxiliaries-supplemented channels will be once every 48 microseconds.

In an operative routine wherein all interlocks are "reset" so as to permit sampling of all of the read-write channels, the distribution of sampling periods in the respective read-write channels would be effected in accordance with the following routine: 1–2–3—1X–2X–3X—1–2–3 — 1S–2S–3S — 1–2–3 — 1X–2X–3X—1–2–3—1A–2A–3A—1–2–3—1X–2X–3X . . . If now, one or more of the interlocks are "set," say, interlocks 155 and 180, the distirbution of sampling periods would be as follows: 1–2–3 — 1X–2–3X — 1–2–3—1S–2–3S—1–2–3—1X–2–3X—1–2–3—1S–2–3A—1–2–3 . . .

It is apparent from the above that any desired sampling routine, with different sampling rates being allocated to the various peripheral devices on a priority basis, may be established by selecting various ones of the above implementations of alternatively constructing additional embodiments utilizing the principles suggested therein.

It is readily apparent that the methods employed in the present invention represent the optimum in hardware expenditures, as well as operating time. In this respect, efficiency in operating time is ensured by placing in the hands of the programmer, the option of employing as many read-write channels as are required to effect the processing within a plurality of peripheral devices. It will further be apparent that the principles of the time-sharing taught by the presently described system are applicable to numerous types of data processing systems well-known in the art, wherein it is desired to simultaneously process information within a plurality of peripheral devices.

While, in accordance with the provisions of the statutes, there has been illustrated and described the best forms of the invention known, it will be apparent to those skilled in the art that changes may be made in the apparatus described without departing from the spirit of the invention as set forth in the appended claims and that, in some cases, certain features of the invention may be used to advantage without a corresponding use of other features. Having now described the invention, what is claimed as new is:

1. A data processing apparatus adapted to transfer information between a storage device and any one of a plurality of peripheral devices via a common distribution circuit comprising a memory cycle distributor having an operatve cycle consisting of a plurality of timing sub-intervals, means connecting said memory cycle distributor to said storage device, means including said common distribution circuit for connecting said memory cycle distributor to said plurality of peripheral devices, means adapted to address a particular one of said plurality of peripheral devices, and means connected to said addressed peripheral device to reserve thereto a particular one of said timing sub-intervals during succeeding operative cycles of said memory cycle distributor.

2. A data processing apparatus for selectively transferring information in accordance with an operating routin to a plurality of associated peripheral devices over a common distribution circuit on a time-sharing basis, comprising: a memory cycle distributor having a sequencing cycle consisting of a predetermined number of time intervals, a plurality of peripheral control units, means including said common distribution circuit connecting said memory cycle distributor to said plurality of peripheral control units, at least one of said peripheral devices operatively connected to each of said plurality of peripheral control units during one of said time intervals and means operatively conditioned by said addressing means to enable said memory cycle distributor to reserve successive ones of a particular one of said predetermined number of time intervals to said at least one of said peripheral devices associated with said particular one of said plurality of peripheral control units.

3. A data processing apparatus for selectively transferring information to a plurality of associated peripheral devices over a common distribution circuit and for simultaneously processing instructions of an operating routine on a time-sharing basis, said apparatus comprising a memory portion for storing said information and the instructions of said operating routine, an arithmetic unit for processing the instructions of said operating routine, means operatively connecting said arithmetic unit to said memory portion, a traffic control portion connected to both said memory portion and said arithmetic unit, said traffic control portion being further connected to a plurality of peripheral control units over said common distribution circuit, each of said plurality of peripheral control units having associated therewith at least one of said plurality of peripheral devices, said traffic control circuit further comprising a sequencing circuit having an operative cycle consisting of a plurality of time intervals, means operatively connected to said common distribution circuit for addressing a limited number of said plurality of peripheral devices, means further connected to said common distribution circuit for reserving a particular one of said time intervals to each of said addresed peripheral devices during succeeding operative cycles of said sequencing circuit upon demands generated by respective ones of said addressed peripheral devices, and means enabling said arithmetic unit to utilize all time intervals of an operative cycle not in demand by said addressed peripheral devices.

4. A data processing apparatus for selectively transferring information during successive operating cycles to a plurality of associated peripheral devices over a common distribution circuit upon a time-sharing basis, said apparatus comprising a memory portion, an arithmetic unit, means operatively connecting said arithmetic unit to said memory portion, a traffic control portion connected to both said memory portion and said arithmetic unit, said traffic control portion further connected to a plurality of peripheral control units over said common distribution circuit, each of said plurality of peripheral control units having associated therewith at least one of said plurality of peripheral devices, means connected to activate particular ones of said plurality of peripheral devices, said traffic control circuit further comprising a sequencing circuit having an operative cycle consisting of a predetermined number of time intervals, means connected to each of said plurality of peripheral control units for reserving a particular one of said time intervals with each of said activated peripheral devices, means operative during each of said time intervals for scanning demands generated by an associated one of said activated peripheral devices and upon detection of a demand generated by said associated one of said activated peripheral devices for allocating the succeeding time interval thereto for the transfer of information between said main memory and said associated one of said activated peripheral devices, and means enabling said arithmetic unit to utilize time intervals of said operative cycle not in demand by said associated one of said activated peripheral devices.

5. A data processing apparatus capable of selectively transferring information to a plurality of associated peripheral devices over a common distribution circuit on a time-sharing basis comprising a plurality of peripheral control units, each of said plurality of peripheral control units being operatively connected with at least one of said plurality of peripheral devices, a sequencing circuit adapted to be cyclically stepped through a predetermined sequence of stages in a predetermined number of time intervals, means including said common distribution circuit connecting said sequencing circuit to said plurality of peripheral control units, means connected to be energized while said sequencing circuit is operative in one of said time intervals to activate a particular one of said peripheral control units, means connected to said particular one of said peripheral control units to be responsive to said activation signal to further activate said at least one of said peripheral devices associated with said particular one of said peripheral control units, and means to specify to said particular one of said peripheral devices a particular one of said time intervals to be reserved thereto during subsequent sequencing cycles of said sequencing circuit so as to thereby preclude the operating of another peripheral device during said reserved time interval.

6. A program-controlled data processing system for effecting the operation of a plurality of peripheral devices simultaneous with the processing of said program, comprising a memory portion, an arithmetic portion, a plurality of serially connected peripheral control units, each of said plurality of peripheral control units having associated therewith at least one of said plurality of peripheral devices, a cyclically operative memory cycle distributor having a sequencing cycle of predetermined duration, said sequencing cycle further comprising a predetermined number of sub-intervals, means operatively interconnecting said memory portion, said arithmetic portion and said memory cycle distributor, said memory cycle distributor being further connected in common to said plurality of serially connected peripheral control units, each of said plurality of serially connected peripheral control units including means conditioned during one of said sequencing cycle sub-intervals to thereby address a particular one of said peripheral devices, said last-named means further including means capable of reserving to said addressed peripheral device a particular one of said sub-intervals occurring during subsequent sequencing cycles thereby precluding the operation of another peripheral device during said particular one of said sub-intervals occurring during the balance of operation of said particular one of said peripheral devices.

7. A cyclically operative multi-stage memory cycle distributor having a sequencing cycle consisting of a predetermined number of sub-intervals, normally operative means for successively allocating a particular one of said sequencing cycle sub-intervals over a common distribution circuit alternately to a first and then a second associated peripheral device, comprising: a first ring counter having a sequencing cycle of predetermined time duration, a second ring counter having a sequencing cycle of time duration equal to a multiple of said sequencing cycle associated with said first ring counter, a plurality of two-state devices having a set and a reset condition, a plurality of AND gates corresponding to the number of said two-state devices, each of said plurality of AND gates being conditioned by inputs from an associated one of said two-state device, and by selective outputs from said first and second ring counters, said two-state device when operative in a particular one of said two states enabling said memory cycle distributor to successively allocate said particular one of said sequencing cycle sub-intervals to said first associated peripheral device only.

8. A memory cycle distributor having a sequencing cycle consisting of a predetermined number of sub-intervals including normally operative means for allocating a particular one of said sequencing cycle sub-intervals successively to a plurality of peripheral devices so as to enable the transfer of data to said plurality of peripheral devices over a common distribution circuit on a time-sharing basis, comprising: a first cyclically operative multi-stage sequencing circuit having a cycling time of predetermined duration, a second cyclically operative multi-stage sequencing circuit having a cycling time equal to a predetermined multiple of the cycling time of said first sequencing circuit, a plurality of bistable devices, each of said bistable devices having a set and a reset state, gating means associated with each of said bistable devices, each of said gating means having conditioning means connected thereto, said conditioning means connected to each of said gating means including an input from an associated one of said bistable devices, said gating means being further conditioned by selective outputs from said first and second sequencing circuits, said bistable device when operative in a particular one of said bistable states enabling said memory cycle distributor to allocate successive ones of said particular one of said sequencing cycle sub-intervals to a particular one of said associated peripheral devices only.

9. A data processing apparatus comprising a memory cycle distributor having a sequencing cycle consisting of a predetermined number of time intervals and including normally operative means for allocating a particular one of said sequencing cycle time intervals successively to a plurality of control units so as to enable the selective transfer of information in accordance with an operating routine to a plurality of associated peripheral devices over a common distribution circuit on a time-sharing basis, comprising: a memory portion, an arithmetic unit operatively connected to said memory portion, a traffic control portion connected to both said memory portion and said arithmetic unit, said traffic control portion being further connected to a plurality of peripheral control units over said common distribution circuit, each of said plurality of peripheral control units having associated therewith at least one of said plurality of peripheral devices, said traffic control circuit further comprising first timing means having a cycling time of predetermined duration, second timing means having a cycling time equal to a predetermined multiple of the cycling time of said first timing means, a plurality of multi-stable devices each having a set and a reset state, gating means operatively conditioned by a particular one of said plurality of multi-stable devices, said gating means being further conditioned by selective outputs from said first and second sequencing circuits, said multi-stable devices when operative in a particular one of said states enabling said memory cycle distributor to allocate successive ones of said particular one of said sequencing cycle sub-intervals to a particular one of said associated peripheral devices only.

10. A memory cycle distributor having a sequencing cycle consisting of a predetermined number of sub-intervals including normally operative means for allocating a particular one of said sequencing cycle sub-intervals successively to a plurality of peripheral devices so as to enable the transfer of data to said plurality of peripheral devices over a common distribution circuit on a time-sharing basis, comprising: first timing means having a cycling time of predetermined duration, second timing means having a cycling time equal to a predetermined multiple of the cycling time of said first timing means, a plurality of multi-stable devices each having a set and a reset state, gating means operatively conditioned by a particular one of said plurality of multi-stable devices, said gating means being further conditioned by selective outputs from said first and second sequencing circuits, said multi-stable devices when operative in a particular one of said states enabling said memory cycle distributor to allocate successive ones of said particular one of said sequencing cycle sub-intervals to a particular one of said associated peripheral devices only.

11. A data processing apparatus comprising a memory cycle distributor having a sequencing cycle consisting of a predetermined number of time intervals and including normally operative means for allocating a particular one of said sequencing cycle time intervals successively to a plurality of control units so as to enable the selective transfer of information to a plurality of associated peripheral devices over a common distribution circuit on a time-sharing basis comprising: a memory portion, an arithmetic unit operatively connected to said memory portion, a traffic control portion connected to both said memory portion and said arithmetic unit, said traffic control portion being further connected to a plurality of peripheral control units over said common distribution circuit, each of said plurality of peripheral control units having associated therewith at least one of said plurality of peripheral devices, said traffic control circuit further comprising: a first cyclically operative multi-stage sequencing circuit having a cycling time of predetermined duration, a second cyclically operative multi-stage sequencing circuit having a cycling time equal to a predetermind multiple of the cycling time of said first sequencing circuit, a plurality of bistable devices, each of said bistable devices having a set and a reset state, gating means associated with each of said bistable devices, each of said gating means having conditioning means connected thereto, said conditioning means connected to each of said gating means including an input from an associated one of said bistable devices, said gating means being further conditioned by selective outputs from said first and second sequencing circuits, said bistable device when operative in a particular one of said bistable states enabling said memory cycle distributor to allocate successive ones of said particular one of said sequencing cycle sub-intervals to a particular one of said associated peripheral devices only.

12. A memory cycle distributor having a sequencing cycle consisting of a predetermined number of sub-intervals including normally operative means for allocating successive ones of said memory cycle sub-intervals to a particular one of said plurality of peripheral devices so as to enable the transfer of data to said particular one of said plurality of peripheral devices over a common distribution circuit, said normally operative means comprising: a master sequencing circuit, said master sequencing circuit further comprising a plurality of stages, first timing means connected to said master sequencing circuit and enabling said master sequencing circuit to be cyclically stepped through said plurality of stages in a predetermined time interval, at least one secondary sequencing circuit, each of said secondary sequencing circuits comprising a plurality of stages, additional timing means connected to each of said secondary sequencing circuits and enabling said secondary circuits to be cyclically stepped through said plurality of stages in a predetermined time interval which may differ from that of the master sequencing circuit and from that of the other ones of said secondary circuits, a plurality of bistable circuits having a set and a reset state, logical means associated with each of said bistable circuits and partially conditioned by an input therefrom, means further connecting the output of at least one of said plurality of stages of said master sequencing circuit as conditioning means to each of said logical means, and means connecting the outputs of selective ones of said secondary sequencing circuits as further conditioning means to each of said logical means whereby said timing signals in combination with the inputs to each of said bistable devices determines the distribution of data to selective ones of said plurality of peripheral devices on a time-sharing basis.

13. A system designed to communicate freely between a main memory and a plurality of peripheral devices over a common distribution circuit on a time-sharing basis comprising: a memory cycle distributor, said memory cycle distributor including means to differentiate each operative cycle thereof into a plurality of sequencing cycle sub-intervals, means for addressing particular ones of said plurality of peripheral devices during successive ones of said sequencing cycle sub-intervals and means operative upon addressing of particular ones of said plurality of peripheral devices for successively reserving a particular one of said sequencing cycle sub-intervals alternately to a first and then a second associated peripheral device.

14. A data processing apparatus for transferring information between a memory portion and any one of a plurality of peripheral devices via a common distribution circuit comprising a memory cycle distributor having an operative cycle comprised of a plurality of timing sub-intervals, means connecting said memory cycle distributor to said memory portion, means further connecting said memory cycle distributor to said plurality of peripheral devices, means connected to address a particular one of said plurality of peripheral devices during one of said timing sub-intervals, and means connected to said addressed peripheral device for reserving thereto said particular one of said timing sub-intervals during succeeding operative cycles of said memory cycle distributor.

15. A data processing apparatus for transferring information between a storage device and a plurality of peripheral devices comprising a sequencing circuit having an operative cycle consisting of a plurality of time intervals, means including a common distribution circuit for interconnecting said storage device, said sequencing circuit and said plurality of peripheral devices, means adapted to address a limited number of said plurality of peripheral devices, means connected to said common distribution circuit for reserving a particular one of said time intervals to each of said addressed peripheral devices during succeeding operative cycles of said sequencing circuit, and means enabling said arithmetic unit to utilize all time intervals of an operative cycle not in demand by said addressed peripheral devices.

16. A data processing apparatus comprising a memory portion, an arithmetic unit operatively connected to said memory portion, a traffic control portion connected to both said memory portion and said arithmetic unit, said traffic control portion being further connected to a plurality of peripheral control units over a common distribution circuit, each of said plurality of peripheral control units having associated therewith at least one of said plurality of peripheral devices, said traffic control circuit further comprising a sequencing circiut having an operative cycle consisting of a plurality of time intervals, means adapted to address a limited number of said plurality of peripheral devices, means normally operative to reserve successive one of a particular one of said plurality of sequencing circuit time intervals alternately to a first and then a second associated peripheral device, and means connected to enable said last-named means to reserve successive one of said particular one of said plurality of sequencing cycle time intervals to either said first or said second peripheral device only.

17. A data processing apparatus for transferring information between a memory portion and a plurality of peripheral devices comprising a sequencing circuit having an operative cycle consisting of a plurality of time intervals, means including a common distribution circuit for interconnecting said memory portion said sequencing circuit and said plurality of peripheral devices, means adapted to address a limited number of said plurality of peripheral devices, means normally operative to reserve a particular one of said sequencing circuit time intervals during successive operative cycles successively to at least two of said addressed peripheral devices, and means connected to enable said last-named means to reserve successive ones of said particular sequencing cycle time interval to a particular one of said at least two peripheral devices only.

18. An electronic data processing apparatus comprising a central processor, a plurality of peripheral devices operatively connected to said central processor via a common distribution circuit having but a single data transfer path, said data processing apparatus further comprising means for transferring information via said common distribution circuit on a time-sharing basis, said last named means comprising timing means defining a plurality of time oriented read-write channels, the number of said time oriented read-write channels being such as to accommodate the anticipated traffic within the system but being less in number than said plurality of peripheral devices, and means including said timing means for freely assigning each of said time oriented read-write channels to a particular one of said peripheral devices as said time oriented read-write channels become free, a time oriented read-write channel so assigned to a particular one of said peripheral devices remaining exclusively reserved thereto pending completion of its current operation while permitting its unused time to be utilized by said central processor.

References Cited
UNITED STATES PATENTS

| 3,200,380 | 8/1965 | MacDonald et al. | 340—172.5 |
| 3,238,298 | 3/1966 | Willis | 178—50 |

ROBERT C. BAILEY, *Primary Examiner.*

O. E. TODD, *Assistant Examiner.*

UNITED STATES PATENT OFFICE
CERTIFICATE OF CORRECTION

Patent No. 3,323,110

May 30, 1967

Louis G. Oliari et al.

It is certified that error appears in the above identified patent and that said Letters Patent are hereby corrected as shown below:

Column 20, line 23, "said plurality of peripheral" should read -- said peripheral control units, means adapted to address a particular one of said plurality of peripheral --. Column 24, line 59, "circiut" should read -- circuit --.

Signed and sealed this 10th day of March 1970.

(SEAL)
Attest:

Edward M. Fletcher, Jr.

Attesting Officer

WILLIAM E. SCHUYLER, JR.

Commissioner of Patents